United States Patent Office 3,194,504
Patented July 13, 1965

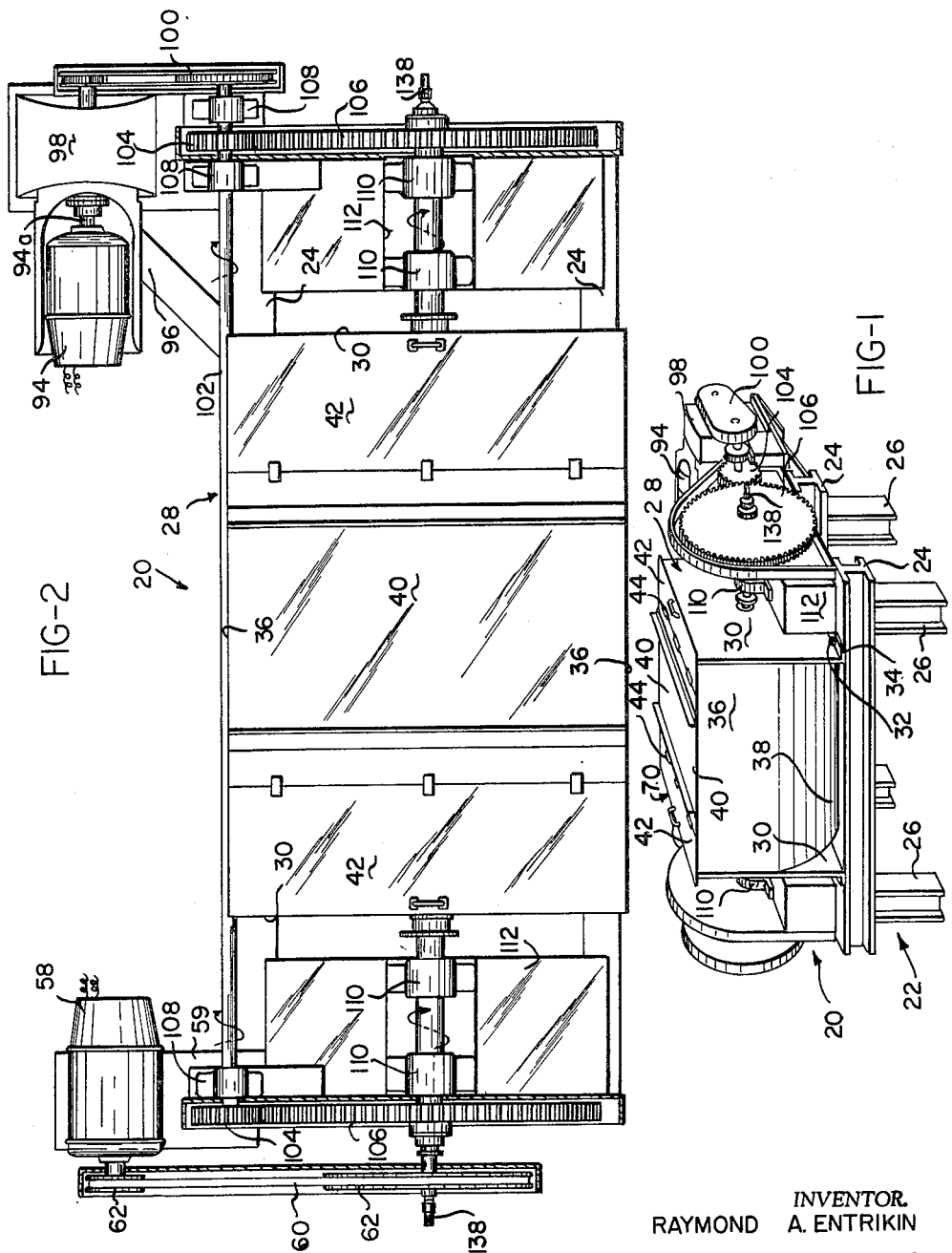

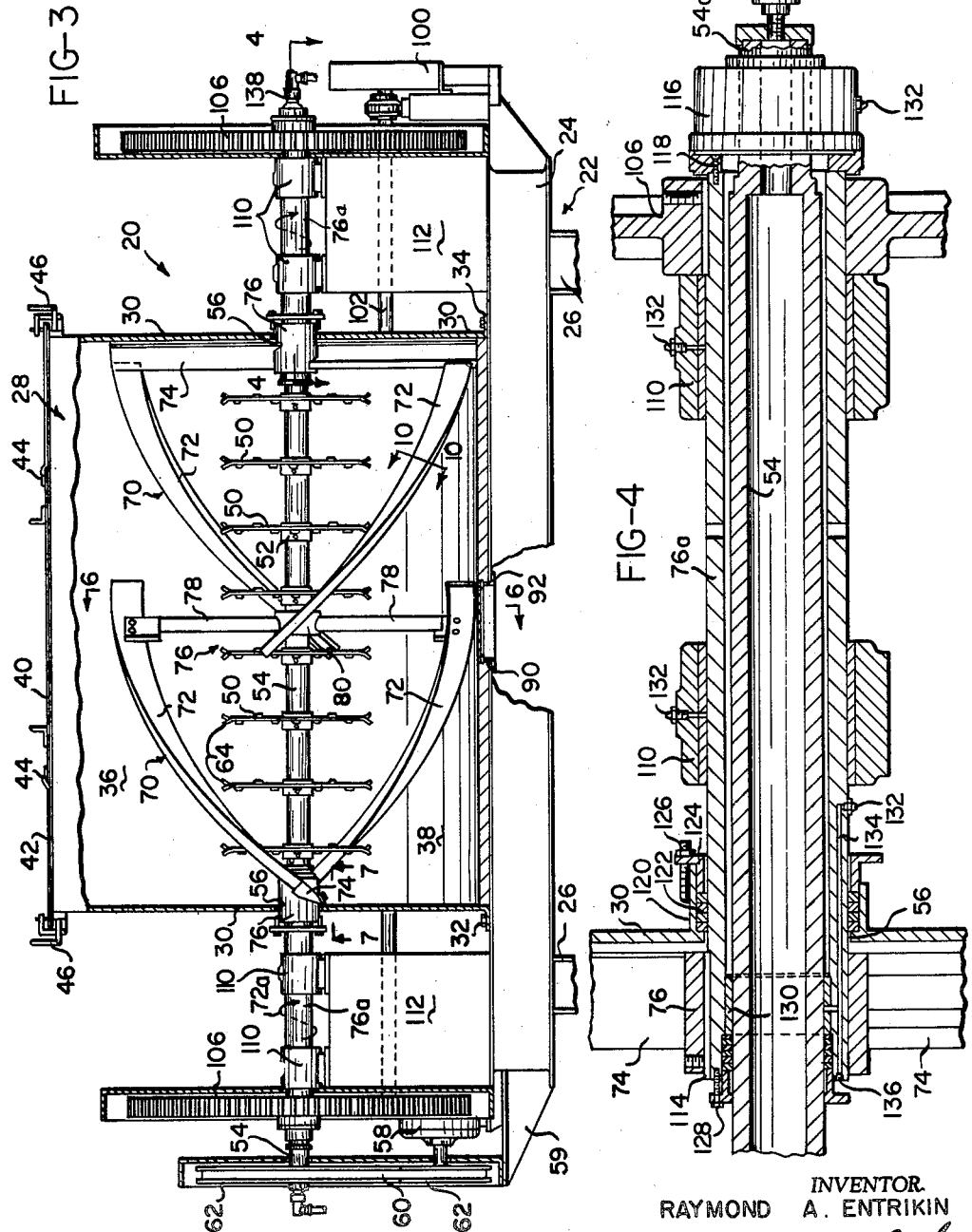

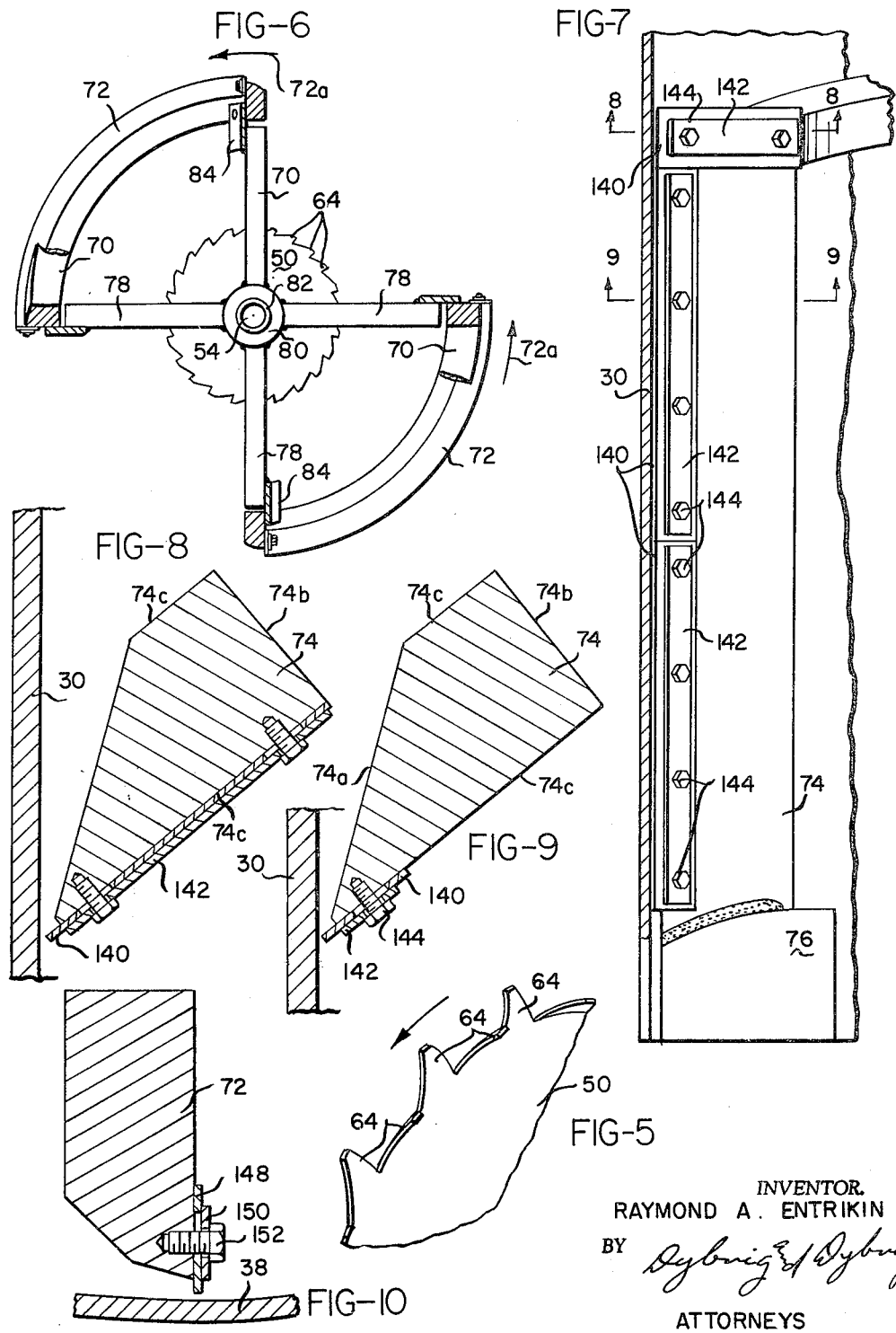

3,194,504
MIXING MACHINE
Raymond A. Entrikin, East Liverpool, Ohio, assignor to Patterson Industries, Inc., a corporation of Ohio
Filed Sept. 7, 1962, Ser. No. 222,004
7 Claims. (Cl. 241—98)

This invention relates to a mixing machine and particularly to mixing machines of the type adapted to mix particulate solids, although the invention is not necessarily so limited. As will be apparent, a mixing device made in accordance with this invention may be used in mixing any dry material and is especially advantageous in mixing material that is fibrous and tends to mat.

An object of this invention is the provision of a mixing machine incorporating elements to mix particulate or fibrous material which continuously mixes the material and directs or urges the material being mixed to the center of the mixing area of the machine.

Another object of this invention is the provision of a mixing machine in which mixing elements direct a mix to a centrally located discharge port.

Other objects and advantages reside in the construction of parts, the combination thereof, the method of manufacture and the mode of operation, as will become more apparent from the following description.

Referring to the drawings, FIGURE 1 is a perspective view of a mixing machine made in accordance with this invention.

FIGURE 2 is a plan view, with portions broken away, of the machine of FIGURE 1.

FIGURE 3 is a side elevational view, with portions shown in cross-section, of the machine of FIGURE 1.

FIGURE 4 is a cross-sectional view of a portion of a drive mechanism taken along line 4—4 of FIGURE 3.

FIGURE 5 is a partial perspective view of a disintegrator blade used in the machine of FIGURE 1.

FIGURE 6 is a cross-sectional view of a portion of a pair of mixing blade assemblies taken along line 6—6 of FIGURE 3.

FIGURE 7 is a partial elevational view taken along line 7—7 of FIGURE 3 showing a ribbon blade support and a scraper assembly associated therewith.

FIGURE 8 is a cross-sectional view of the blade support taken along line 8—8 of FIGURE 7.

FIGURE 9 is a cross-sectional view of the blade support taken along line 9—9 of FIGURE 7.

FIGURE 10 is an enlarged cross-sectional view taken along line 10—10 of FIGURE 3 of a ribbon blade and a scraper assembly associated therewith.

Referring to the drawings in greater detail, a mixing machine made in accordance with this invention, generally indicated at 20, may be mounted upon a support assembly 22 which may comprise a conventional table or, as shown in FIGURE 1, a pair of parallel I-beams 24 mounted upon support legs 26. Mixing of materials is accomplished within a hopper or tank, generally designated 28, comprising a pair of spaced, parallel end walls 30 secured to the top surface of the I-beams 24 as by bolts 32 which pass through lower, horizontally projecting flange portions 34 connected to the end walls 30. The hopper or tank 28 also includes vertical side walls 36 and a semi-cylindrical bottom wall 38, which may be integral with the side walls 36. The top of the tank or hopper 28 may be covered by a cover plate 40 having a pair of cover doors 42 hinged thereto as shown at 44. The cover doors 42 are releasably secured in closed position by toggle clamps 46 mounted on horizontal flanges formed along the top edges of the end plates 30. It is to be understood that the tank or hopper 28 and the support 22 therefor may take any conventional form.

The material to be mixed is inserted through either side of the cover by opening the doors 42 and is mixed, primarily, by a plurality of spaced, parallel disintegrator blades 50 having hub portions 52 fixedly attached to a rotating center shaft 54, which is mounted upon a horizontal axis within apertures 56 in the end walls 30 in a manner described below. The shaft 54 is driven by a motor 58 drivingly connected thereto by means of a belt 60 and pulleys 62. As shown best in FIGURE 2, the motor 58 is secured to a bracket 59 connected to the support 22 and the driving connection 60, 62 is mounted upon the I-beams 24.

The disintegrator blades 50 may take any conventional shape. As shown best in FIGURE 5, each blade 50 may simply comprise a vertically disposed sheet metal disc, the periphery of which is cut to form teeth 64, adjacent teeth 64 being disposed arcuately outwardly in opposite directions from the plane of the center of the disc. The drive between the motor 58 and the center shaft 54 is such as to cause the blades 50 to rotate at high speeds, thus dispersing and disintegrating a dry mix or dispersing a fibrous mix which tends to mat.

In the past, various mechanisms have been designed to cause portions of the mix to be directed to the area of the disintegrator blades. For example, some mixing machines have mechanisms to tilt the hopper or tank, thus causing the mix to be moved from top to bottom of the tank or from one side to the other. In accordance with this invention, the material being mixed is continuously circulated through the hopper or tank 28 and directed to the area of the disintegrator blades 50 by means of a pair of material moving or ribbon blade assemblies generally designated 70. Referring to FIGURES 3 and 6, each of the blade assemblies 70 is shown as comprising a pair of helical ribbon blades 72 mounted in surrounding relation to the disintegrator blades 50. The ends of the blades 72 nearest the end walls 30 are connected to end support arms 74 mounted on sleeves or hubs 76 which in turn are mounted for rotation on the center shaft 54. The inner ends of the blades 72 are mounted upon a spider or center support formed by four radially projecting center support arms 78 attached at their inner ends to a hub 80 which is mounted for rotation on the center shaft 54. As illustrated in FIGURE 6, the center support arms 78 project at mutual right angles one to the other such that the axes of alternate arms 78 are colinear, effectively forming two supports at mutual right angles one to the other. One pair of aligned arms 78 serves to support the inner ends of a pair of blades 72 forming one assembly 70, while the other pair of center support arms 78 similarly supports the other pair of blades 72. The blades 72 are connected to the support arms 78 by means of connecting plates 84, there being one plate 84 adjacent the outer end of each support arm 78 and welded or otherwise attached adjacent the end of a blade 72. The blades 72 accordingly are supported by the center support arms 78 such that the adjacent inner ends thereof overlap.

For reasons which will be discussed below, the end support arms 74 are generally rectangular, but have a tapered forward face 74a opposite a rear face 74b. The arms 74 are welded to the hub or sleeve 76 in such manner that their parallel side faces, designated 74c, project at an acute angle with respect to the end wall 30. (See FIGURES 7, 8 and 9.) As shown in FIGURE 3, the outer ends of the blades 72 abut against the rear faces 74b of the support arms 74 and are welded otherwise affixed thereto. As apparent from an inspection of FIGURES 3 and 6, each helical blade 72 projects through an arc of slightly more than 90° from its point of abutment with the rear face 74b of its support arm 74 to beyond its corresponding center support arm 78. Also, each blade 72 is twisted throughout its length such that its wider side faces are pitched throughout the length thereof. The degree of pitch may be varied as desired. In the embodiment illustrated in the drawings, the blades 72 are each twisted through 180° along the length thereof.

The direction of rotation of the ribbon blades 72 is indicated by arrows 72a in FIGURES 3 and 6. Note that both ribbon blades 72 comprising each blade assembly 70 are pitched in the same direction but the pair of blades 72 on the left side of FIGURE 3 are pitched in an opposite hand to those on the right side. The pitch of the blades is such that the material being mixed will be lifted by the blades 72 as they rotate and, in addition, since the pair of blades 72 on the right side are pitched oppositely from the pair of blades on the left side, both pairs of blades will direct the material being mixed toward the center of the tank 28. The reasons for the opposite pitch of the two blade assemblies 70 are twofold. It is desirable that the mix be directed to the central area of the tank to be acted upon by the disintegrator blades 50. In addition, the discharge port for the mixing machine, designated 90, is located centrally of the bottom wall 38 of the tank 28. Normally, the discharge port is closed by a conventional gate valve assembly designated 92. When the mixing is completed, however, the gate valve 92 is opened and the mix discharged. While a central discharge is often the most convenient location for removal of the mix, central discharge ports have proved cumbersome since the mix tends to settle along the entire length of the tank 28. Due to the unique construction of the blade assemblies 70, substantially complete removal of the mix is accomplished merely by their continued rotation. Note that while the blades 72 are designed to lift the mix as they rotate, the lifting action is not as efficient as the action of the blades in moving the mix toward the center since the effective blade area is relatively small. Thus, the mix will rapidly discharge through the central port 90 while the blade assemblies 72 are rotating.

FIGURES 2, 3 and 4 illustrate a suitable drive for the blade assemblies 70, including a motor 94 mounted upon a support bracket 96 connected to the support 22. The motor shaft, designated 94a, is connected by a speed reducer 98 to a chain and sprocket arrangement 100, thence to a countershaft 102, which extends lengthwise along the side of the tank 28. The opposite ends of the shaft 102 are connected by spur gears 104 and 106 to extensions 76a of the sleeves or hubs 76 on each side of the tank 28. The opposite ends of the shaft 102 are supported by bearing blocks 108, while the sleeve extensions 76a are supported by bearing blocks 110 at each end thereof which derive support from mounting blocks 112.

FIGURE 4 shows in detail the manner in which a sleeve extension 76a is connected to the sleeve or hub 76 for one pair of the end support arms 74. As shown therein, the sleeve extension 76a is hollow to receive the center shaft 54 which drives the disintegrator blades 50 and is keyed to the hub or sleeve 76 by means of a key 114. A bearing cap 116 is attached as by screws 118 to the outer end of each sleeve extension 76a. The cap 116 has a central aperture rotatably receiving an outwardly projecting reduced portion 54a of the center shaft 54. The end of the sleeve extension 76a adjacent the end wall 30 is supported in spaced relation thereto by a stuffing box 120 including packing rings 122 held in place by a gland ring 124 which in turn is mounted in fixed relation to the exterior of the stuffing box 120 by means of self-locking screws such as that designated at 126. A similar stuffing box 128 and a metal bushing 130 support the inner end of the sleeve extension 76a in surrounding relation to the center shaft 54. Thus, it is seen that the center shaft 54 is effectively supported by the sleeve extensions 76a. Of course, both sleeve extensions 76a shown in FIGURE 3 are of the same construction as that shown in FIGURE 4. If desired, the center shaft 54 may be hollow, as illustrated in FIGURE 4, and rotary unions 138 may be connected thereto for the passage of a coolant. Several grease fittings 132 are provided for lubrication of the rotating members 54 and 76a. The lubricating passageway 134 to the left in FIGURE 4, for lubricating the bushing 130, is capped by a plug 136.

The operation of the machine as thus far described is believed obvious. The motor 94 and the speed reducer 98 are designed to rotate the ribbon blades 72 at a slower speed than the speed of rotation of the disintegrator blades 50, since the ribbon blades 72 are designed primarily to circulate the mix through the tank. It has been found that a more efficient and rapid mixing of dry materials is accomplished by rotating the blade assemblies 70 in a direction opposite to the direction of rotation of the blades 50. This probably results from the fact that the blades 50 will induce a certain rotary motion to the mix which is counteracted by the blades 72.

Referring now to FIGURES 7, 8, 9 and 10, the end support arms 74 and the blades 72 may be provided with scraper assemblies adapted to engage the end walls 30 of the tank 28 and also the semi-cylindrical bottom wall 38. To this end, as shown in FIGURES 7, 8 and 9, the longer side 74c of each end support arm 74 is provided with one or more scraper blades 140 secured thereto by scraper blade retainer plates 142 which are attached to the arms 74 as by bolts 144. The scraper blades 140 are so located on the arms 74 that their scraping edges lead the direction of rotation of the arms and extend along the entire radial length thereof. Since the side faces 74 of the arms 74 project at an acute angle to the end walls 30, a very efficient and complete scraping action is obtained. FIGURE 10 illustrates the manner in which a similar scraping assembly, including a scraper blade 148, a retainer plate 150, and a bolt 152 may be connected to the outermost edges of the ribbon blades 72. Several such scraping assemblies may be placed end-to-end along the entire length of the blades 72. For most efficient scraping of the semi-cylindrical bottom wall 38, and also most efficient circulation of the mix, the ribbon blades 72 lie in a cylindrical surface coaxial with the inner surface of the bottom wall 38. Because the inner ends of the two blade assemblies overlap, particles cannot accumulate along the bottom wall 38.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A mixing device comprising: a container; a plurality of disintegrator blades mounted for rotation in the container; a plurality of material moving blades mounted for rotation relative to said disintegrator blades and in surrounding relation to the disintegrator blades, said material moving blades being pitched to direct material from the ends to the center of the container, and means driving said disintegrator blades and said material moving blades.

2. A mixing machine comprising: a container; inner and outer rotating blade assemblies mounted in said container, said inner blade assembly including a plurality of centrally located disintegrator blades, said outer blade assemblies including opposed pairs of oppositely pitched blades for directing material toward the center of the container and toward said inner blade assembly, and means driving said blade assemblies in opposite directions of rotation relative to one another.

3. A mixing device comprising: a container; a plurality of disintegrator blades mounted for rotation in said container; a plurality of material moving blades spaced radially outwardly from said disintegrator blades and mounted coaxially therewith, said material moving blades comprising spaced pairs of oppositely pitched ribbon blades; means driving said disintegrator blades and said ribbon blades in opposite directions, said ribbon blades being pitched to direct material to the center of the container.

4. The device of claim 3 wherein said ribbon blades are mounted on support arms, there being one pair of support arms at each end of the container supporting the outer ends of said ribbon blades and two pairs of support arms supporting adjacent ends of both pairs of blades.

5. The device of claim 4 wherein the length of each pair of ribbon blades exceeds one-half the length of the container, adjacent ends of said ribbon blades overlapping, and wherein said ribbon blades are supported by said support arms in a position to scrape the container over portions of the rotary movement thereof.

6. The device of claim 4 wherein the disintegrator blades are mounted on a common shaft, said support arms being mounted on a plurality of sleeves encircling said shafts, and wherein means connected to at least one of said sleeves supplies rotary motion to said ribbon blades.

7. A mixing device comprising: a container, a substantially central discharge port in the bottom of said container, a plurality of generally planar disintegrator blades mounted for rotation about an axis passing through said container and laterally spaced along said axis; a plurality of material moving blades spaced radially outwardly from said disintegrator blades mounted for rotation about said axis, said material moving blades comprising spaced pairs of oppositely pitched ribbon blades; means driving said ribbon blades in a first direction about said axis of rotation; means driving said disintegrator blades at higher speeds than and in an opposite direction to said first direction about said axis of rotation, said ribbon blades being pitched to direct material within the container toward said axis and to the center of the container.

References Cited by the Examiner
UNITED STATES PATENTS

| | | | |
|---|---|---|---|
| 1,116,110 | 11/14 | Pfouts | 259—45 |
| 1,660,221 | 2/28 | Dimm | 241—98 |
| 2,139,274 | 12/38 | Justice et al. | 259—110 |
| 2,240,841 | 5/41 | Flynn | 241—98 |
| 2,521,398 | 9/50 | North. | |
| 2,784,950 | 3/57 | Bakewell | 259—105 |
| 3,043,571 | 7/62 | Swarthout | 259—105 X |

FOREIGN PATENTS

| | | |
|---|---|---|
| 163,173 | 5/49 | Austria. |
| 648,783 | 8/37 | Germany. |
| 184,433 | 8/22 | Great Britain. |

J. SPENCER OVERHOLSER, *Primary Examiner.*